United States Patent

Busian

[15] 3,681,836
[45] Aug. 8, 1972

[54] DYNAMOELECTRIC MACHINE AND METHOD AND APPARATUS FOR USE IN MANUFACTURING SAME

[72] Inventor: Vincent V. Busian, Fort Wayne, Ind.
[73] Assignee: General Electric Company
[22] Filed: May 25, 1970
[21] Appl. No.: 40,224

[52] U.S. Cl. .............................................. 29/205 D
[51] Int. Cl. ............................................. H02k 15/00
[58] Field of Search ..29/205 D, 205 R, 203 D, 149.5

[56] References Cited

UNITED STATES PATENTS

| | | | |
|---|---|---|---|
| 2,740,910 | 4/1956 | Fleischer | 310/211 |
| 2,912,290 | 11/1959 | Shaffer | 308/163 |
| 2,958,908 | 11/1960 | Thompson et al. | 264/267 X |
| 3,166,828 | 1/1965 | Tupper | 29/149.5 |
| 3,250,579 | 5/1966 | Tupper et al. | 308/127 |

Primary Examiner—Thomas H. Eager
Attorney—John M. Stoudt, Radford M. Reams, Ralph E. Krisher, Jr., Frank L. Neuhauser and Oscar B. Waddell

[57] ABSTRACT

Apparatus includes means for reducing the axial length of a thrust member to a preselected length relative to a reference portion of a rotatable assembly and may also include reducing the length of a second thrust member to establish a preselected distance between two thrust surfaces. Apparatus includes a pair of opposed rams having spacer collapsing tooling that includes anvil means for collapsing the spacers and abutment means for engaging other portions of a rotatable assembly. A lost motion mechanism interconnects one of the anvil means and one of the abutment means. The spacers may form part of a rotatable assembly of a dynamoelectric machine. At least one spacer may be collapsed from an initial length, in its free form, to a preselected length in its final configuration, to provide means for controlling end play of the assembly and for establishing a desired alignment of the assembly with the stationary structure of the machine. Collapsing the spacer reduces an internal diameter of the spacer and rigidly secures the spacer to a shaft portion of the assembly.

9 Claims, 12 Drawing Figures

Inventor:
Vincent V. Busian,
By Ralph E. Krisher Jr.
Attorney.

DYNAMOELECTRIC MACHINE AND METHOD AND APPARATUS FOR USE IN MANUFACTURING SAME

BACKGROUND OF THE INVENTION

This invention relates generally to apparatus that may be used to particular advantage in the manufacture of machines wherein two or more component parts are assembled together in predetermined dimensional relationship, and, more particularly, in the manufacture of machines wherein one such component part is provided with one or more surface regions that are spaced preselected distances from reference portions of the component.

Satisfactory performance of diverse types of machinery is usually dependent on component parts of the machinery being assembled together within specified dimensional tolerances. In the case of rotatable machines, such as, for example, dynamoelectric machines, a rotatable member is assembled with a stationary member so that during normal operation there will be little or no relative movement between the members along the rotational axis of the machine.

In electric motors, this relative movement is often referred to as "end play." When excessive, end play may have a pronounced effect on the operation of a device being driven, as described, for example, in Thompson et al U.S. Pat. No. 3,020,105 which issued Feb. 6, 1962 and which is assigned to the assignee of this patent application.

Accordingly, efforts have been made to reduce, if not eliminate, end play by using cured thermosetting resins positioned between a shoulder on a shaft and a stationary thrust member. Another approach has involved the use of combinations of shim washers of different thickness that are selected on a trial and error basis. This approach is referred to in Wightman U.S. Pat. No. 2,539,879, dated Jan. 30, 1951. These shim washers have been used at one or both ends of a rotatable member to hold it in a desired nominal position between a pair of bearings.

An approach suitable for use in a unit bearing type motor is described in the Wightman patent as involving the use of a single standard thickness thrust washer positioned between a shoulder on the rotor shaft and the outboard end of the unit bearing, and the use of an inboard washer member crimped against grooves on the inboard end of the rotor shaft. In this latter approach, the inboard washer has been assembled on the shaft after the rotor has been assembled with the bearing and after a desired amount of end play has been established. Still other approaches are described in Bussone U.S. Pat. No. 2,947,893 dated Aug. 2, 1960.

For optimized motor performance, it is desirable, among other things, for the stationary and rotating magnetic material to be aligned or centered relative to each other in order to minimize fringing of magnetic flux at the ends of the rotor and the concomitant magnet and electrical losses which reduce motor efficiency. Furthermore, and as will be understood by persons skilled in the art, in motors of common design, the rotor will tend to center itself relative to the stator magnetic material during operation. In the usual arrangement where a rotor is constrained at the time of assembly to a precise location relative to one or more bearings, the self-centering action of an improperly aligned rotor may contribute to increased frictional engagement of parts of the motor thrust system and, in aggravated cases, measurably decrease the efficiency of the motor in addition to accelerating wear of the thrust system.

Although the above described approaches of using crimped washers and thermosetting resins have been improvements in the art, they have still been expensive to implement in practice. In addition, while providing a means for limiting rotor shaft end play relative to one or more bearings, these approaches, in practice, have not provided an economical means for accurately aligning and centering a rotor relative to the magnetic material of a stator.

On the other hand, the practice of placing combinations of shim washers of different thicknesses at each end of a rotor prior to assembly with a stator is prohibitive in cost. This is due to the fact that several different thicknesses of shim washers must be stocked, and measurements must be made to determine what combination of shim washer thicknesses would be needed to establish a shim washer surface at a preselected distance from a reference portion of the rotor or rotor shaft. In addition, previously positioned loose washers may literally fall off the rotor shaft prior to final motor assembly in the absence of special handling procedures or additional means for holding the shim washers in place on the rotor shaft.

Because of the various subjective determinations that must be made when using the shim washer approach, the time required for shimming each end of a rotor and the opportunity for errors in operator judgment is relatively great. On the other hand, the other practical approaches referred to in the above referenced patents have also been expensive in practice.

It will therefore be understood that it would be desirable to provide an improved arrangement for restricting end play of a rotor shaft. It also would be desirable to provide means for consistently and economically establishing one or more surface regions on a rotatable assembly of a dynamoelectric machine at preselected distances from a reference portion of the assembly. In addition, it would be desirable to provide methods and apparatus for economically and reliably manufacturing dynamoelectric machines and assemblies for use therein wherein means are provided that may be used to control shaft end play and that may also be used to center a rotatable member relative to a stationary member.

SUMMARY OF THE INVENTION

Accordingly, it is an object of the present invention to provide improved apparatus for securing together components of an assembly and establishing preselected spatial relationships between parts thereof.

Another object of the present invention is to provide improved apparatus for use in the manufacture of rotatable members, e.g., rotatable assemblies.

A still further object of the present invention is to provide improved apparatus for use in the manufacture of a dynamoelectric machine rotatable assembly.

In carrying out these and other objects, in one form, there is provided improved apparatus that may be used to particular advantage in the manufacture of a dynamoelectric machine, and more particularly for use in manufacturing a rotatable assembly thereof. In a preferred form, a spacer is placed on an end of a rotor shaft and a surface region of the spacer is deformed longitudinally along the shaft toward the rotor core which was previously secured to the shaft. The spacer is stressed and deformed by the apparatus until the surface region of the spacer is in a desired preselected position relative to the core and until the spacer is deformed into a final configuration so as to secure it to the shaft. The spacer can be used as part of the motor thrust system and/or be used for establishing a predetermined alignment between motor parts, e.g., a rotor and stator. The apparatus also is useable to deform a spacer on each end of the shaft, with a first spacer being formed initially on one side of the core as just described. The surface region of the first spacer conveniently is used as a reference portion of the rotatable assembly while a second spacer is deformed to a desired final configuration on the other side of the core.

The exemplified apparatus is useable for securing together an assembly for use in the manufacture of a dynamoelectric machine and in a preferred form, includes a pair of opposed double acting hydraulic rams with double end rods. Each rod is provided with an anvil forming part of the tooling of the apparatus and which engages a spacer on a rotatable assembly, including a rotor core, while the spacers are axially compressed between the two rams. A fixed abutment and a movable abutment engage opposite end faces of the core. The movable abutment moves with one of the rods and is secured thereto by a spring biased lost motion linkage. In the preferred arrangement, the movable abutment, the fixed abutment, and both anvils coact to collapse one spacer (to thereby press internal surfaces thereof against the shaft of the assembly) and hold the core in a fixed or seated position. Thereafter, one anvil and the two abutments coact to collapse the other spacer. Upon completion of a cycle of operation of the exemplified apparatus, a first one of the spacers has a surface region spaced a first preselected distance from a reference portion of the rotor, e.g., and end lamination of a laminated rotor core. The second spacer has a surface region spaced a second preselected distance from the surface region of the first spacer.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawings.

DESCRIPTION OF THE PREFERRED EMBODIMENTS

Turning now to the drawings in more detail, and in particular to FIGS. 1 through 4, there is illustrated a double shaft, band mount type of induction motor 20 comprised of a stator 21, end frames 22, bearings, a rotatable assembly 23, and a thrust system.

The rotatable assembly includes the shaft 24, a conventional short circuited squirrel cage winding and laminated magnetic core 28 comprised of a stack of laminations 29 which collectively will be referred to hereinafter as a rotor. Conductor bars 33 and end rings 34 are illustrated as having been formed of a suitable electrically conductive material, such as aluminum, in a die cast process. The rotatable assembly 23 also includes means for controlling the end play of the rotor when it is assembled with the stator 21 and these means are illustrated as comprising cylindrical spacers or sleeves 36 and 37.

Figures 1, 3, 4:
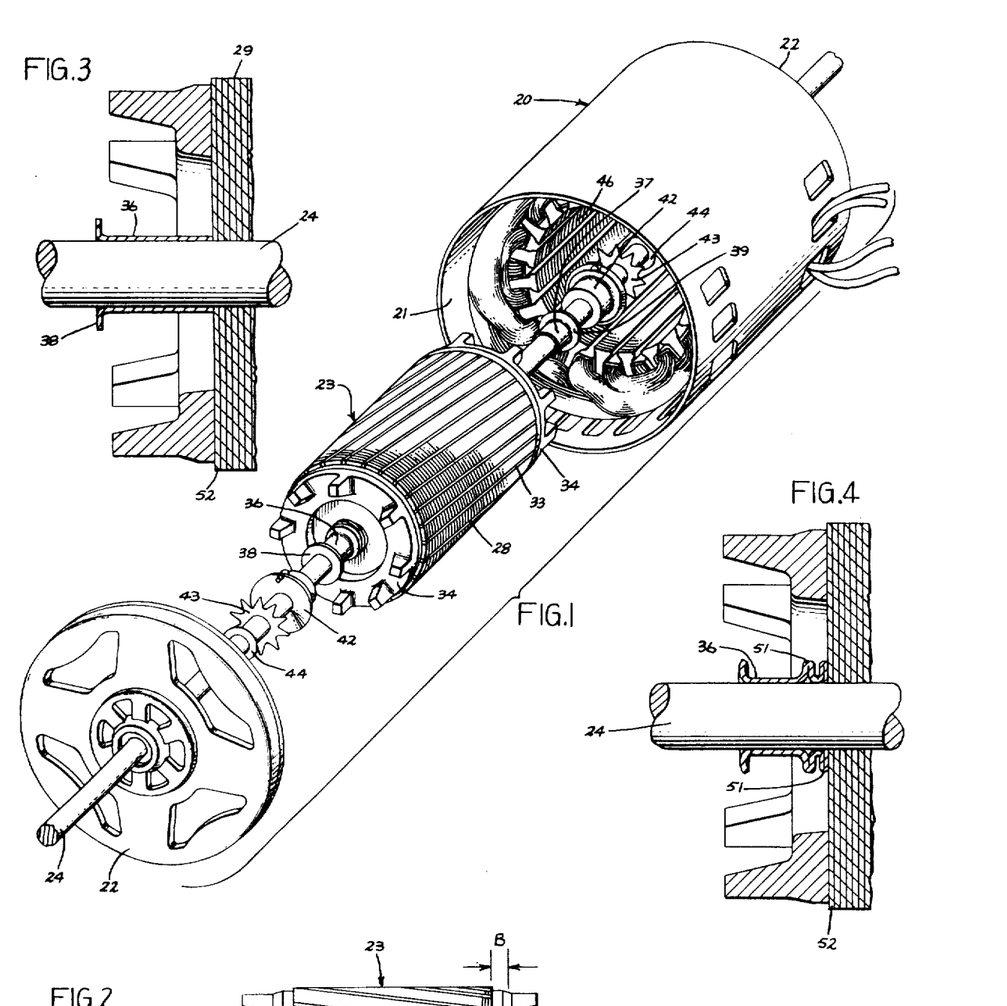
FIG. 1 is an exploded perspective view of a dynamoelectric machine with parts thereof formed by utilization of apparatus embodying the invention in one form, parts of the dynamoelectric machine being broken away and a part shown in its free form for the purpose of illustration.
FIG. 3 is a side elevational view, partly in section and with parts broken away, of an end of the rotatable assembly shown in FIG. 2, with a spacer shown in its free form prior to being deformed to a final configuration and secured to the rotatable assembly.
FIG. 4 is a view similar to FIG. 3 with the spacer of FIG. 3 compressed longitudinally along the rotor shaft axis to its final configuration.

As will be appreciated from FIG. 1, the spacers 36, 37, have surface regions which are defined by the flanges 38, 39 and may be used as thrust members. These surface regions are located preselected distances relative to the end lamination 41 of the rotor core and relative to each other as will be more thoroughly described hereinafter. For purposes of illustration in FIG. 1, the thrust member 37 is shown in its free form prior to being deformed and rigidly secured to the shaft 24 to form part of the rotatable assembly 23.

The structure illustrated in FIG. 1 includes thrust members 42 which abut the surface regions of the flanges 38, 39. The thrust members 42 are similar to the thrust members disclosed in the above identified Bussone patent.

Also included is a pair of star springs 43 of the type disclosed in the Myron D. Tupper U.S. Pat. No. 3,038,765 which issued June 12, 1962 and is also assigned to the assignee of the present invention. Thrust washers 44 are provided between the star springs 43 and the surfaces of the bearings carried by the end frames 22.

As previously indicated, it is desirable for a number of reasons to limit or control the amount of end play of the rotor relative to the stator during the operation of the motor 20. Also as will be appreciated from the above background of the invention, it is very desirable to provide for the relatively precise centering or alignment of the magnetic portion of the rotor assembly, i.e., the stack of magnetic laminations 29, relative to the magnetic portion of the stator 21, e.g., the stack 46 of stator laminations.

The stack heights of magnetic laminations vary from stack to stack because of normal manufacturing tolerances. In order to compensate for such variations, I have provided means for restricting the end play of the rotor relative to the end frames and for economically establishing a desired alignment between the rotor and stator.

In the motor 20, these means comprise the spacers 36, 37. With reference to FIG. 3, it will be appreciated that the spacer 36, in its free form, has the configuration of a flanged cylinder. This is also the configuration of the free form of spacer 37 which for purposes of illustration is shown in its free form in FIG. 1.

FIG. 4 shows the final form or configuration of the spacer 36 after it has been deformed and rigidly secured to the shaft 24. The final configuration of the spacers 36 and 37 is attained by applying an axial force against the flanges of the spacers to reduce the longitudinal or axial length of the spacers. This force causes the spacers to collapse and reduces at least portions of the internal diameter of the spacers. FIG. 4 clearly shows the collapsed condition and final configuration of spacer 36 with an undulated surface as shown at 51. Although the sleeve 36 tightly engages the shaft 24, it will be understood that engagement of the shaft and spacers is not necessary for the practice of my invention.

Figure 2:
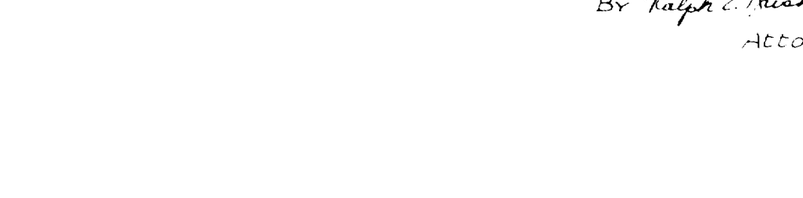
FIG. 2 is a side elevational view, with parts broken away, of the rotor shown in FIG. 1.

By collapsing the spacers preselected amounts, precise alignment of the rotatable and stationary magnetic material may be attained. With reference to FIG. 2, it will be appreciated that the over-all dimension or distance "A" between the surface regions of flanges 38, 39 is preselected to control the amount of end play of the rotor. However, simply holding this dimension "A" to a prescribed nominal preselected value would not assure proper alignment between the rotor and stator iron during operation of the motor 20. The alignment of these parts may, however, be controlled by preselecting and holding the dimension or distance "B" between the surface region of the flange 39 and a reference portion of the rotatable assembly such as the face of the end lamination 41.

In the manufacture of the rotatable assembly 23, I loosely position the spacers 36, 37 on the shaft 24 in their free form as indicated by the phantom line position of the spacers in FIG. 4. Then, I have collapsed the spacer 37 to the position shown in full in FIG. 2 an amount just sufficient to establish the flange surface region of the spacer 37 at the preselected distance "B" from the Furthermore, of the end lamination 41.

After establishing the location of the surface region of the spacer 37, I collapse the sleeve 36 to the final configuration shown by solid lines in FIG. 2 and as shown in FIG. 4. The spacer 36 is collapsed along the shaft 24 until the over-all distance, corresponding to the distance "A," is equal to the preselected distance which will yield the desired controlled amount of end play.

It will be appreciated that, in addition to providing an improved structural arrangement, I have provided a method for use in the manufacture of a dynamoelectric machine which includes collapsing a spacer against a shaft in order to rigidly secure the spacer to a rotatable assembly and establish a surface region at a precise axial location along a shaft.

FIGS. 5 through 9 illustrate apparatus 71 embodying the invention in one form and particularly adapted for use in the manufacture of a dynamoelectric machine and more particularly for use in securing together a rotatable assembly such as the rotatable assembly 23 shown in FIG. 1.

Figures 5, 6, 7, 10:
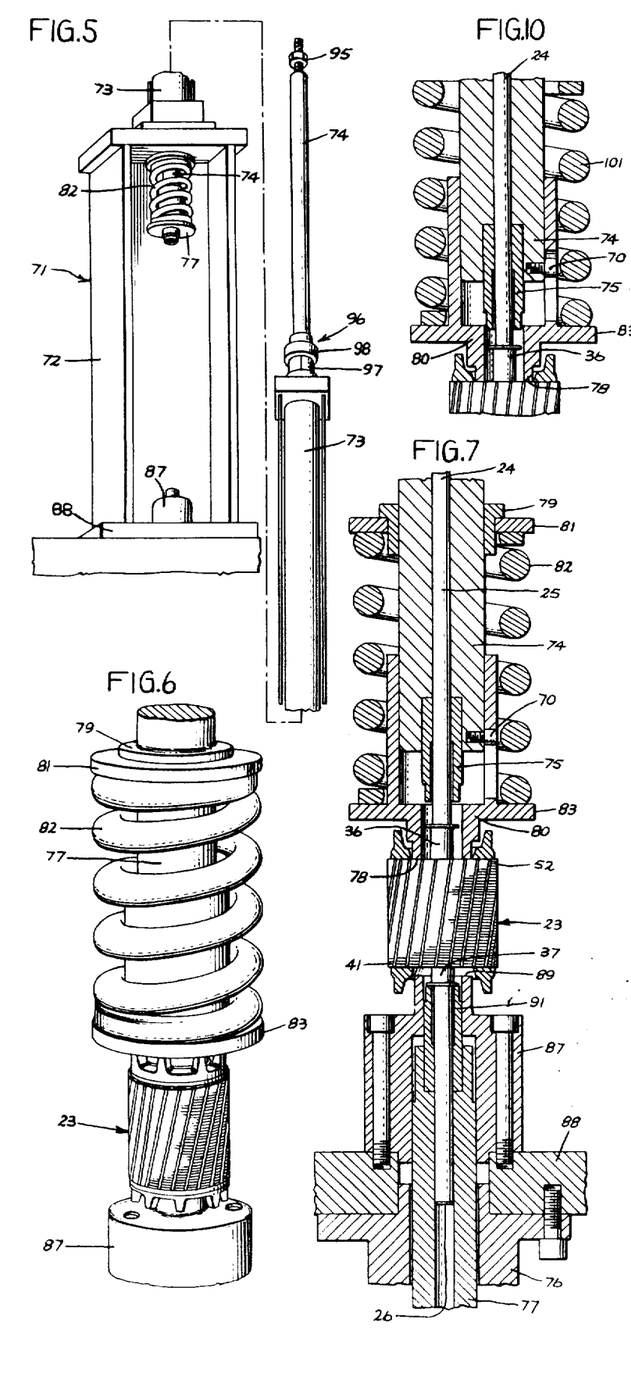
FIG. 5 is a perspective view, with parts broken away and parts removed, of an apparatus embodying the invention.
FIG. 6 is a perspective view, with parts broken away, of the apparatus of FIG. 5 during operation of the apparatus.
FIG. 7 is a side elevational view, in cross section, of the apparatus shown in FIG. 5 at the beginning of one cycle of operation of the apparatus.
FIG. 10 is a view similar to FIG. 8 showing another embodiment of the apparatus during the part of the operational sequence corresponding to that illustrated by FIG. 8.

The over-all arrangement of the apparatus 71 is best revealed in FIG. 5. The apparatus 71 includes a frame 72, a double acting hydraulic ram 73 with a double end rod 74 (best shown in FIG. 7), a double acting hydraulic ram 76 having a double end rod 77, and control means which will be described hereinafter in connection with FIG. 12.

The rams 73 and 76 are secured by any suitable means such as bolts, studs, or welds to the frame 72 and are oppositely disposed in facing relationship at opposite ends of the frame 72.

First and second tooling assemblies are provided for receiving the ends 25, 26 of the shaft 24. One of these tooling assemblies includes an anvil 75 carried by the rod 74 of the cylinder 73 and abutment means illustrated as a pressing head 80 having an abutment surface 78 for engaging the surface of the end lamination 52. This tooling assembly also includes lost motion means for interconnecting the abutment surface 78 and anvil 75. The exemplified lost motion means includes a retaining collar 79 secured to the rod 74 by suitable means such as one or more set screws or a weld bead, a spring retaining ring 81, a coil spring 82 and a flange 83 of the pressing head 80.

The other tooling assembly includes abutment means in the form of a fixture 87 secured by bolts or other suitable means to the bed 88 of the frame 72. The fixture 87 has an abutment surface 89 for engaging the surface of the end lamination 41 of the assembly 23, and an anvil 91 adapted to engage surface regions of the sleeve 37.

In preparation for operation of the apparatus 71, the sleeves 36, 37 are loosely assembled on the shaft 24 and, with the rams 73, 76 in their retracted positions, the rotatable assembly 23 is positioned with the lower end 26 of the shaft positioned in the fixture 87 and extending through a bore in the anvil 91 and rod 77. Then a control circuit is actuated and low pressure hydraulic fluid raises the lower rod 77 to the position shown in FIG. 7. At this same time, the upper rod 74 moves at a low power level to the position shown in FIGS. 6 and 7.

In the FIG. 7 position, the sleeve 37 is supported on the anvil 91 with the end lamination 41 spaced from the abutment surface 89. The anvil 75 of the upper tooling assembly, however, is spaced from the sleeve 36 whereas the abutment surface 78 of the pressing head 80 is in engagement with the surface of the end lamination 52. At this point in the operational cycle of the apparatus 71, hydraulic fluid under high pressure is applied to the rams 73 and 76 to establish an increased power level as will be described more fully hereinafter in the discussion of FIG. 11.

Figure 8:
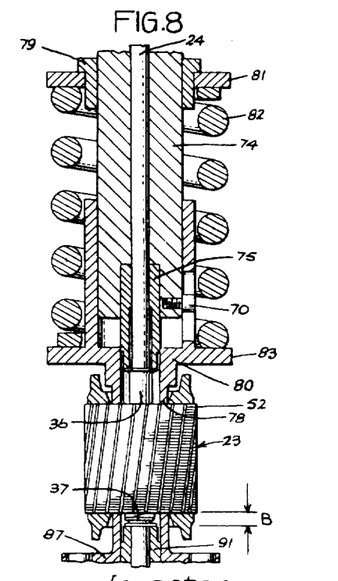
FIG. 8 is a view similar to FIG. 7 showing the apparatus during a cycle of operation.
Figure 9:
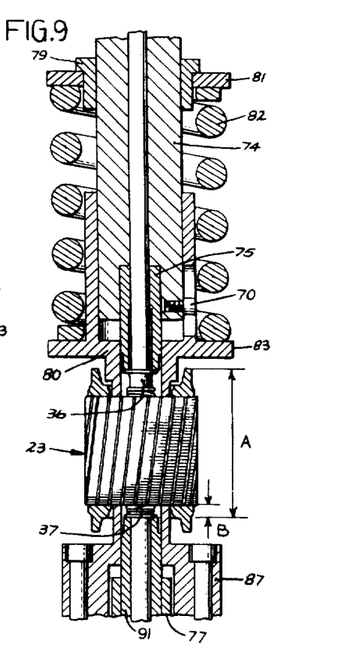
FIG. 9 is a view similar to FIG. 7 showing the apparatus as one cycle of operation as being completed.

As the high pressure fluid is admitted to the cylinders, the lower rod 77 is retained in its extreme upward position as shown in each of FIGS. 7, 8 and 9. In addition, the upper rod 74 moves downwardly and moves through a lost motion increment of travel relative to the pressing head 80 while compressing slightly the compression spring 82. The spring 82 in the embodiment of FIGS. 7–9 is sufficiently weak that the spring is compressed during the lost motion travel of rod 74 and neither of the spacers 36, 37 are collapsed at this time. However, as the anvil 75 engages the spacer 36, the combined force exerted by the anvil 75 and pressing head 80 is sufficient to move the assembly 23 against the lower abutment surface 89 of the fixture 87. This movement collapses the spacer 37 to the preselected length identified by the distance "B" in FIG. 8.

It will be noted that the spacer 37 is collapsed prior to distortion of or collapse of the spacer 36. The upper spacer 36 is not collapsed at this time since the total downward force applied to the spacer 36 is equal only to the force exerted by the anvil 75, and this force is equal to the difference between the downward force of the rod 74 and the force exerted by the pressing head 80 against the lamination 52. As the end lamination 41 seats against the abutment surface 89, the pressing head 80 is restrained from further movement by the end lamination 52. This condition is illustrated by FIG. 8. However, the anvil 75 then moves through a second increment of lost motion travel relative to the pressing head 80 and exerts sufficient force to collapse the spacer 36 to the final configuration shown in FIG. 9. At this time, the distance "A" is established between the selected surface regions of the spacers 36, 37.

The spacer 36 is collapsed until the rod 74 reaches its lower limit of travel and, at this time, the apparatus 71 is recycled, the rod 74 returns to its retracted position, the spring 82 expands and establishes the relative position between the pressing head 80 and anvil 75 as shown in FIGS. 5 and 7, and the lower rod is free to move to its retracted position. In the rest position, screw 70 retains the pressing head 80 in assembled relation with the rod 74.

It will be understood that the distance "B" of FIGS. 8 and 9 is determined by the extent of upward travel of the anvil 91 secured to the lower rod 77 and that, after the distance "B" has been established, the over-all distance "A" between the selected surface regions of the spacers 36, 37 is determined by the extent of total downward travel of the upper rod 74. furthermore, a lost motion interconnection between one of the abutment surfaces 78 or 79 and one of the anvils 75 or 91 causes one of the spacers consistently to be collapsed prior to the collapse of the other spacer.

The limits of travel of the rods 74 and 77 are determined by simple adjustments which are most readily described by again having reference to FIG. 5. In FIG. 5 it will be seen that the maximum downward travel of the rod 74 is limited when an adjustable stop nut 95 carried by the upper end of the rod 74 engages the adjustable stop 96 supported at the outer end of the cylinder 73. A fine adjustment of the travel of rod 74 may be made by moving the stop nut 95 along the threaded portion of the shaft 74, whereas a course adjustment of rod travel readily may be made by changing the length of pairs of split sleeves 97. This type of change is readily accomplished by raising the spacer retaining ring 98, removing the split sleeves and replacing them with longer or shorter sleeves. Thereafter, the retaining ring 98 is again dropped into place to lock the split sleeves in place at the top of the ram 73 as shown in FIG. 5. It will be understood that this type of course adjustment is normally made when it is desired to secure spacers to a rotatable assembly having a different stack height of laminations than the stack height for the rotatable assembly 23.

The upward travel of the lower rod 77 is adjusted and determined by a stop nut, split sleeves, and a retainer ring substantially identical to those shown in FIG. 5. Since the means for adjusting the travel of the lower rod 77 is substantially the same as the means used for adjusting the travel of the upper rod 74, these means have not been illustrated in the drawings.

Now having reference to FIG. 10, a modified embodiment of the apparatus 71 will be described. The apparatus represented by FIG. 10 is identical in all respects to the apparatus 71 with the exception that the spring 101 is stiffer than the spring 82.

With this modification the point of time during the operational cycle of the apparatus represented by FIG. 10 corresponds to the point of time in the operational cycle represented by FIG. 8, i.e., the lower sleeve 37 is collapsed to its final configuration and the end lamination 41 is resting against the lower abutment surface 89. It will be noted from FIG. 10, however, that the anvil 75 has not yet engaged the spacer 36. This is caused by the fact that, with the stiffer spring 101, the force required to compress the spring 101 and effect a lost motion increment of travel of the anvil 75 relative to the pressing head 80 is greater than the force required to collapse the not shown spacer 37.

With the modification of FIG. 10, continued downward travel of the rod 74 from the position shown in FIG. 10, will effect a lost motion increment of travel of the anvil 75 relative to the pressing head 77 and cause the pressing head and anvil to be relatively positioned in exactly the same manner as illustrated in FIG. 9 at the end of the operational cycle of the apparatus.

Thus, it will be understood that the stiffness of the springs 82 and 101 is not critical to the practice of the invention. Furthermore, it is only desirable that sufficient total force be applied to one side of the rotatable assembly to effect the preselected amount of crushing of the spacer disposed on the other side of such assembly. Therefore, the abutment means at either side of the rotatable assembly may be interconnected to the anvil on that same side of the assembly through any suitable lost motion connection.

Furthermore, if the advantage of being able to adjust the preselected distances "B" and "A" is not deemed to be desirable, one of the anvil means may be rigidly secured to one of the abutment means. For example, if it is not desired to adjust the preselected distance "B," the lower ram 76 may be eliminated and the anvil 91 may be rigidly secured to and form a part of the fixture 87 having an abutment surface 89 and being at least a part of an abutment means as previously described.

In those applications where it is not desired to provide the flexibility afforded by changing the distance "A," the upper anvil 75 may be rigidly secured to the pressing head 80 with the distance between the abutment surface 78 and the striking surface of the anvil 75 being fixed to correspond to the desired final length of the upper spacer 36. In this case then, assuming that it were desired to collapse the upper spacer 36 prior to collapsing the lower spacer 37, the anvil 91 could be rigidly secured to the bed 88 as a fixture and the lower abutment surface 89 could be interconnected with the bed 88 and anvil 91 through a lost motion mechanism.

Figure 11:
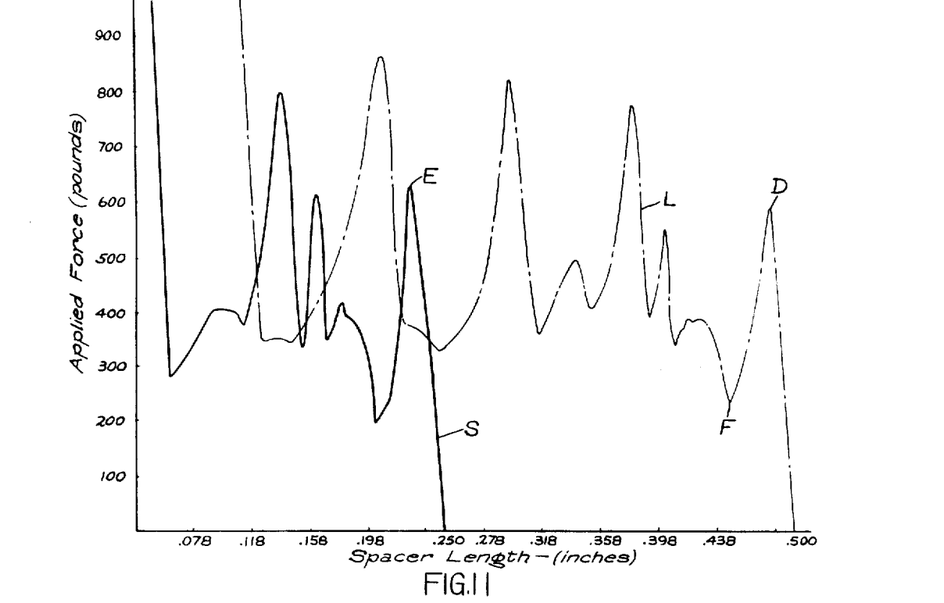
FIG. 11 is a graph showing representative spacer lengths--applied axial forces for spacers of the type and sizes shown in FIG. 1.

Turning now to FIG. 11, there is shown a graph of spacer length versus collapsing force for a pair of spacers of the type and size of spacers 36, 37. The original traces for the curves depicted by the FIG. 11 graph were obtained by positioning spacers similar to the spacers 36, 37 on a shaft similar to the shaft 24 of the motor 20 and applying a force against the flange end of the spacer while compressing the sleeve against a stop plate. The actual force, in pounds, exerted against the test spacers and the actual length of the spacers was continuously recorded with an X-Y recorder. In FIG. 11, the trace identified by the letter L is typical of the traces that were obtained with the recorder for the relatively longer spacers, e.g., the spacer 36; and the trace S is typical of the traces that were obtained during testing of specimens corresponding to relatively short spacers, e.g., the spacer 37.

It will be appreciated from an inspection of the traces S and L that after an initial peak force was applied to each test spacer the length of the spacers rapidly decreased while the applied force decreased until a lower limit of applied force was reached. These peak points are identified as points D and E in FIG. 11. The dips in the traces, e.g., from D to F on trace L, occurred as the test spacers collapsed.

FIG. 11 clearly reveals that the applied force required to collapse the test spacers a given amount was approximately the same for all samples tested. The data presented by the FIG. 11 curve is useful in determining the suitability of different types of spacers for use in various motor applications. For example, the spacers 36, 37 are suitable for use in applications where the end thrust applied to the motor shaft by a load is not expected to be in excess of about 200 pounds.

The FIG. 11 data is also useful in determining the amount of spacer collapsing force that should be used in the practice of my method as well as in the use of apparatus such as the apparatus 71 shown in FIGS. 5 through 10. For example, in the illustrated embodiment, the shorter spacer 37 is collapsed to establish the preselected distance "B." So long as the applied force exceeds 900 pounds, it is clear from FIG. 11 that either the spacer 37 or spacer 36 can be collapsed to substantially any desired length.

As previously mentioned, the test spacers corresponded to the spacers 36 and 37. By way of exemplification, the spacers were made of common steel, had an outer diameter of .335 inches, a wall thickness of .010 inch, and would freely slide over a .3125 inch diameter rod, this being the nominal diameter of the shaft 24 in the exemplification. All of the spacers had a flange with an outer diameter of .500 inch and an inner diameter the same as the inner diameter of the spacer. The flange thickness was .010 inch. The free length of the spacers was nominally .250 inch for the spacer 37 and .500 inch for the spacer 36. Although steel spacers were used for purposes of exemplification, it will be expressly understood that any other material having satisfactory force-deflection or force-deformation characteristics may be used to form the spacers. Furthermore, the shape of the spacers may be generally cylindrical as illustrated or other suitable shapes.

Figure 12:
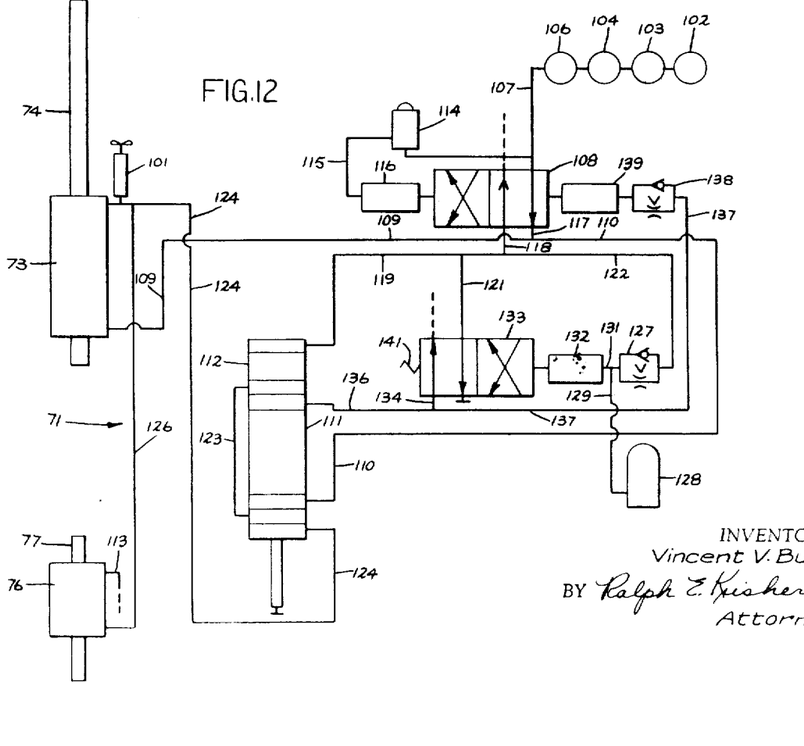
FIG. 12 is a schematic representation of a control circuit that may be used to establish an operational sequence of the apparatus shown in FIG. 5.

Turning now to FIG. 12, there is shown a schematic representation of a control circuit that may be used as a control means for effecting the operational sequence of the apparatus 71 illustrated in FIGS. 5 through 10. To facilitate correlation of figures of the drawings, identical numbers have been used, where appropriate, for the schematic symbols that correspond identically with structural elements in FIGS. 5 through 9. Thus, the rams 73, 76 and rods 74, 77 are identified with those numerals in FIG. 5 and in FIG. 12.

In order to begin operation of the apparatus 71, the manual shut off valve 101 located at the inlet of the upper ram 73 is opened. Then, valve 102 is opened to connect the control circuit of FIG. 12 with an 80 psi air supply. Air, which is used in various timing portions of the control circuit is passed through an air filter 103, an air pressure regulator 104 to reduce the air pressure to a desired nominal value of 30 psi, and a conventional air lubricator 106.

With valves 101 and 102 open, and the apparatus 71 in a rest or dwell condition, air is supplied through line 107, four-way double air-pilot operated detented valve 108 and line 109 to the lower part of ram 73. The air supplied to ram 73 at this time holds the rod 74 in a retracted or upper position. Air is also supplied through line 110 to a conventional 25:1 hydraulic booster 111 with attached reservoir 112. The air supplied by line 110 holds the high pressure ram of the booster 111 in an "up" or temporarily inactive position. The upper port of the ram 76 is vented to atmosphere through line 113 at all times and, while in the rest position, the rod 77 is free to move downwardly as viewed in FIGS. 5–9 and FIG. 12.

After the rotatable assembly 23 has been positioned as described in connection with FIG. 7, the operational sequence of the apparatus 71 is initiated by temporarily closing finger tip air valve 114 which normally bleeds air to the atmosphere. When closed, valve 114 supplies regulated air through line 115 to the detented air-pilot 116 of valve 108. This in turn causes the valve 108 to shift, vent line 117 (and accordingly lines 109 and 110) to atmosphere, discontinue the venting of line 118 to the atmosphere, and connect line 107 to line 118.

At this time, regulated air is supplied to lines 119, 121, and 122. The air in line 119 enters the oil reservoir 112 and forces oil (under low pressure) through a bypass valve through line 123 to the bottom of booster cylinder 111, and through lines 124 and 126 to the rams 73 and 76. The low pressure oil drives the rods 74 and 77, at a relatively low power level, to the position shown in FIG. 7. This provides the advantage of reducing the hazard of damage to equipment and personnel in the event that the shaft is not properly received in the upper tooling assembly.

While air is moving through line 119 to the reservoir 112, air also is moving through line 122 to a timing device comprised of a flow control valve 127 and an air reservoir 128 connected thereto by line 129. The purpose of this timing device is to delay the supply of high pressure hydraulic fluid to the rams 73, 76 until the abutment surface 78 and anvil 91 have firmly seated against the rotatable assembly 23 as shown in FIG. 7.

Returning again to FIG. 11, after a predetermined time, determined by the flow rate through adjustable valve 127 and the capacity of air reservoir 128, sufficient air pressure will exist in line 131 to actuate the air-pilot 132 of air-pilot operated spring return valve 133. As valve 133 is actuated, line 134 ceases to vent to the atmosphere, and air line 121 (now connected to line 107 through valve 108) is connected to line 134. Upon completion of this connection, regulated air is supplied to the upper port of the booster cylinder 111 through line 136 and through line 137 to another timing device comprised of the flow control valve 138. As air is admitted to the upper port of the booster 111, the by-pass valve of reservoir 112 is closed, and high pressure oil is fed through lines 124 and 126 to the rams 73, 76 and thereby establishes an increased power level for operation of the apparatus 71.

In the exemplification, the high pressure oil was sufficient to impart a crushing force of 1500 pounds to rod 74 which had a rod diameter of 1 ¾ inches disposed in the 2 ½ inch bore of ram 73. The ram 76, on the other hand, had a two inch bore and a rod diameter of one inch. The piston area of the rams, as will be understood, was the difference between the cross-sectional area of the ram bore and rod diameter.

The high pressure oil is supplied via lines 124 and 126 for a sufficient period of time (actually, less than one second) to complete the operational sequence represented by FIGS. 8 and 9. The actual duration of this period is adjustable and determined by the adjustable flow control valve 138 since valve 138 provides a delay in the application of full regulated air pressure to the detented air-pilot 139 of valve 108. After the desired time interval, air-pilot 139 resets valve 108 to the original position as illustrated, whereupon line 109 is again supplied with air from line 107 and line 118 is again vented to atmosphere. As this occurs, spring 141 resets valve 133 and line 134 also vents to atmosphere. One cycle of operation of the apparatus 71 is then completed as the booster 111 and valve 138 vent to atmosphere through line 134; the oil reservoir 112, air reservoir 128 and valve 127 vent to atmosphere through lines 122 and 118; the air pressure in line 110 raises the piston of booster 111; and the air pressure in line 109 raises the rod 74 to its rest position.

Although hydraulic rams and air and hydraulic control circuits have been shown for purposes of exemplification, it will be understood that other means, including mechanical and electro-mechanical means may be used to power the anvil means and abutment means of the apparatus 71. Also, electrical, mechanical, or electro-mechanical devices may be used in place of the pneumatic portions of the control circuit shown in FIG. 12.

It will be seen from the foregoing that the present invention provides improved apparatus for use in manufacturing, inter alia, dynamoelectric machine structures.

While the invention has been explained by describing preferred and alternate embodiments thereof, it will be apparent that improvements and modifications may be made without departing from the scope of the invention as defined in the appended claims.

What I claim as new and desire to secure by Letters Patent of the United States is:

1. Apparatus for securing together an assembly comprising a shaft, a component secured to the shaft, and a pair of spacers on each side of the component, and for establishing preselected spatial relationships between selected surfaces and reference portions of the assembly, the apparatus including a first tooling assembly for receiving one end of the shaft, said first tooling assembly including first anvil means for engaging a first one of the spacers and a first abutment surface, and a second tooling assembly for receiving the other end of the shaft, said second tooling assembly including second anvil means for engaging a second one of the spacers and a second abutment surface, and power means for driving at least one of the anvil means through increments of travel, one of said tooling assemblies further including lost motion means interconnected with the abutment surface associated therewith, the last mentioned abutment surface moving in generally the same direction as said at least one of the anvil means during at least one of said increments of travel.

2. The apparatus of claim 1 wherein the power means includes control means for driving said at least one anvil means at a first power level through one increment of travel and for driving said at least one anvil means at an increased power level through another increment of travel.

3. The apparatus of claim 1 wherein the power means is connected to the anvil means of the first tooling assembly and the lost motion means interconnect the abutment surface and anvil means of the second tooling assembly.

4. Apparatus for use in the manufacture of a dynamoelectric machine rotatable member having a shaft, magnetic core, and a pair of thrust members, the apparatus comprising a frame, a first tooling assembly for receiving a first part of the shaft, said first tooling assembly including first abutment means for engaging a first portion of the magnetic core and first anvil means for engaging a first thrust member in proximity to the first part of the shaft, a second tooling assembly for receiving a second part of the shaft, said second tooling assembly including second abutment means for engaging a second portion of the magnetic core and second anvil means for engaging a second thrust member in proximity to the second part of the shaft, said first tooling assembly further including lost motion means interconnecting the first abutment means and the first anvil means to permit relative movement between the first abutment means and first anvil means during operation of the apparatus, power means for effecting relative movement between the first and second tooling assemblies to cause at least one of the tooling assemblies to move toward the other tooling assembly, and control means for providing a predetermined cycle of operation for the apparatus.

5. The apparatus of claim 4 wherein the first abutment means holds the magnetic core against the second abutment means and dwells for a lost motion interval while the first anvil means moves into engagement with the first thrust member.

6. The apparatus of claim 4 wherein the lost motion means includes a spring retaining member and spring means interposed between the spring retaining member and first abutment means.

7. Apparatus for use in the manufacture of a dynamoelectric machine rotatable member having a shaft, magnetic core, and thrust system including at least one collapsible spacer, the apparatus comprising a frame, a tooling assembly carried by the frame for receiving one end of the shaft, said tooling assembly including an anvil means for engaging and compressing the collapsible spacer adjacent one end of the magnetic core, abutment means for engaging the magnetic core adjacent the other end thereof, and power means for driving together said anvil means and collapsible spacer and collapsing the spacer against the shaft.

8. The apparatus of claim 7 wherein the power means comprises a cylinder and piston rod, the piston rod being connected to the anvil means.

9. The apparatus of claim 7 wherein the power means comprise a cylinder and piston rod, the piston rod being connected to the abutment means.

* * * * *

PO-1050
(5/69)

UNITED STATES PATENT OFFICE
CERTIFICATE OF CORRECTION

Patent No. 3,681,836  Dated August 8, 1972

Inventor(s)  Vincent V. Busian

It is certified that error appears in the above-identified patent and that said Letters Patent are hereby corrected as shown below:

The title is changed, at all occurrences, to --APPARATUS FOR USE IN MANUFACTURING DYNAMOELECTRIC MACHINES--.

In the last line of column 5, cancel "Furthermore," and insert --face--.

In column 7, line 58, cancel "furthermore" and insert --Furthermore--.

Signed and sealed this 17th day of April 1973.

(SEAL)
Attest:

EDWARD M. FLETCHER, JR.  ROBERT GOTTSCHALK
Attesting Officer  Commissioner of Patents